United States Patent [19]
Shilliday

[11] 3,745,665
[45] July 17, 1973

[54] ORTHODONTIC GAUGE DEVICE FOR INDICATING INTERINCISAL ANGLES

[76] Inventor: Douglas J. Shilliday, 1501 London Dr., Columbus, Ohio 43221

[22] Filed: Nov. 2, 1970

[21] Appl. No.: 85,993

[52] U.S. Cl. .............................. 33/174 D, 33/174 R
[51] Int. Cl...... G01b 5/25, A61b 5/10, A61c 19/04
[58] Field of Search ..................... 33/174 R, 174 D, 33/143 C, 160

[56] References Cited
UNITED STATES PATENTS

| | | | |
|---|---|---|---|
| 367,290 | 7/1887 | Gilmer | 33/160 |
| 2,665,488 | 1/1954 | Tobey | 33/174 D |
| 1,751,833 | 3/1930 | Millar | 33/174 D |

Primary Examiner—Louis R. Prince
Assistant Examiner—Jon W. Henry
Attorney—William S. Rambo

[57] ABSTRACT

A hand-operated gauge device used particularly by orthodontists and/or dental technicians for rapidly indicating and/or checking the interincisal angle between the upper and lower central incisors of a patient during or following orthodontic correctional procedures. The gauge device comprises a system of interconnected fixed and movable linkage arms or limbs arranged for temporary attachment to a pair of upper and lower central incisors, and has an angle-indicating scale calibrated to indicate the approximate included (interincisal) angle between the long axes of the teeth when in an occluded position.

1 Claim, 7 Drawing Figures

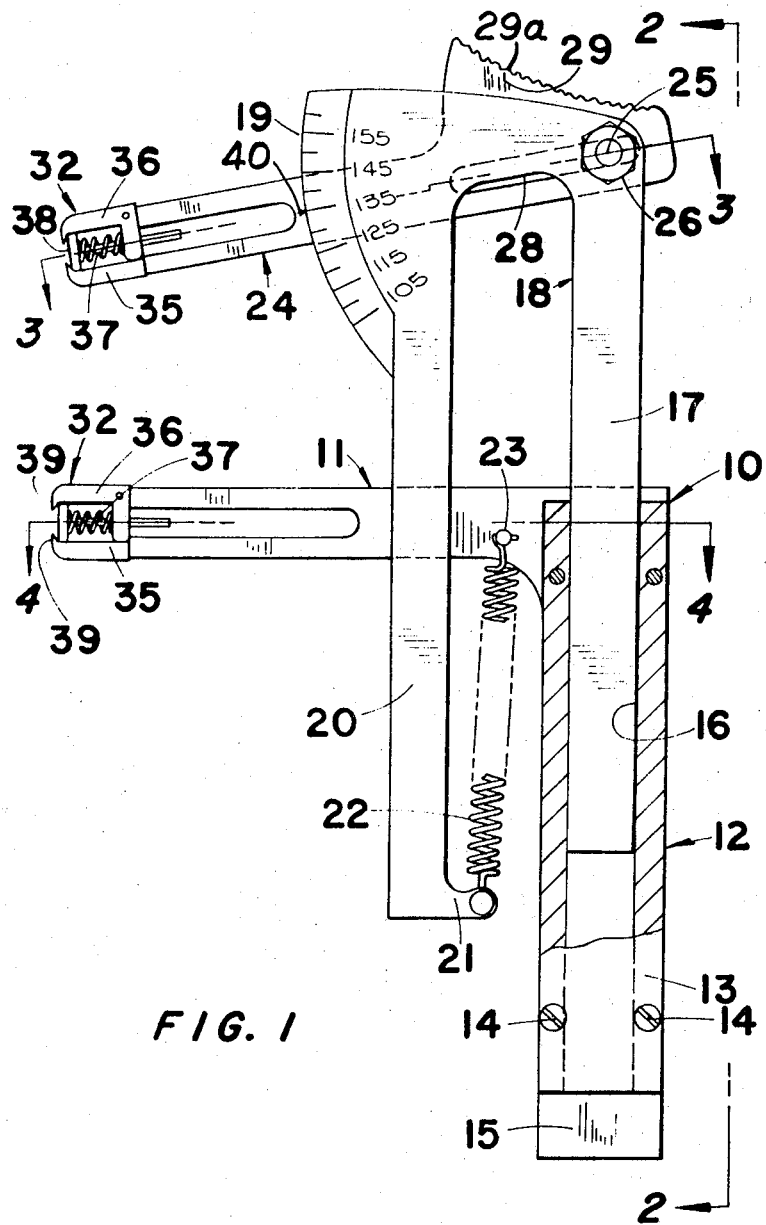
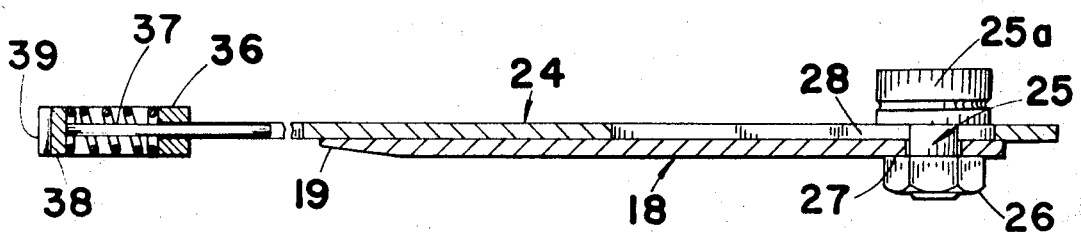
PATENTED JUL 17 1973 3,745,665
SHEET 1 OF 2
INVENTOR.
DOUGLAS J. SHILLIDAY PATENTED JUL 17 1973  3,745,665
SHEET 2 OF 2
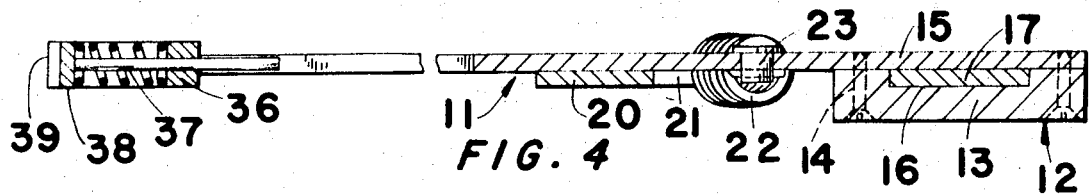
FIG. 4
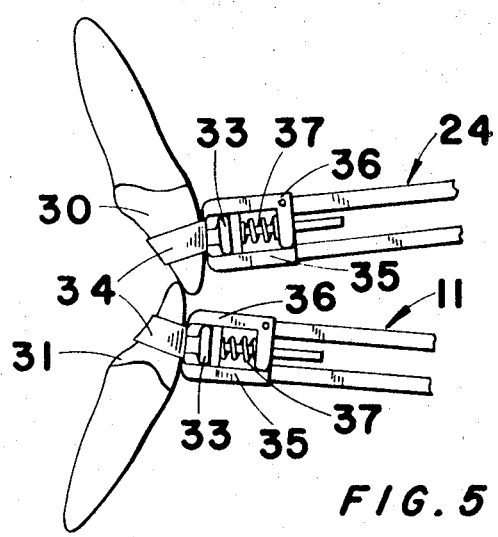
FIG. 5
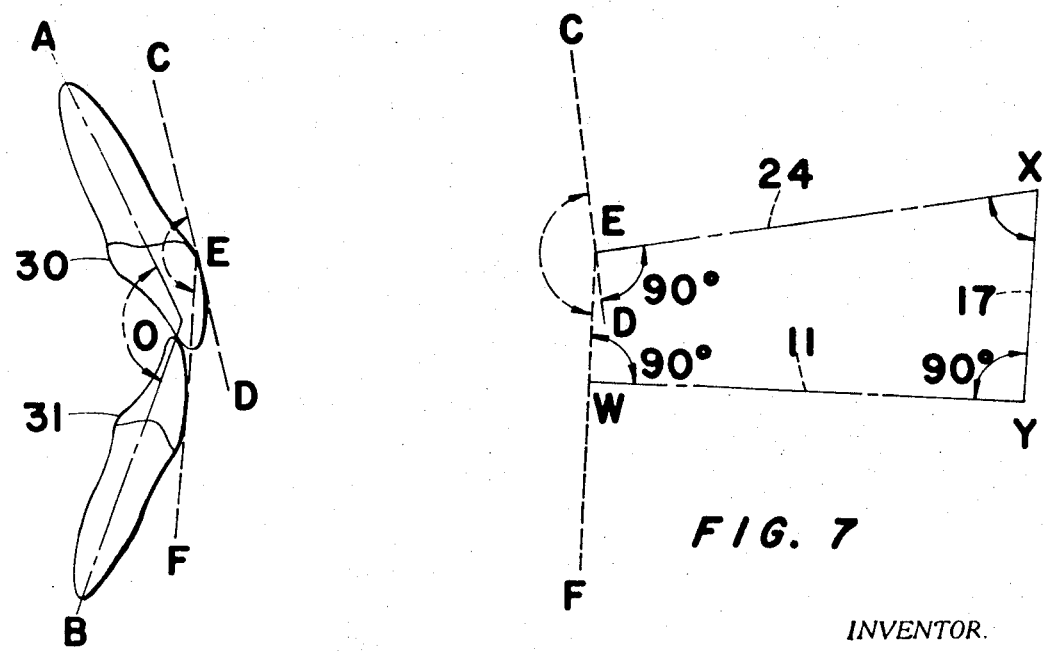
FIG. 6
FIG. 7
INVENTOR.
DOUGLAS J. SHILLIDAY
BY
ATTORNEY

ORTHODONTIC GAUGE DEVICE FOR INDICATING INTERINCISAL ANGLES

BACKGROUND OF THE INVENTION

The present invention relates generally to angle-measuring or indicating gauges, and more particularly to an orthodontic gauge device for indicating the interincisal angle between a pair of central, maxillary and mandibular incisors.

The included angle formed between the long axes of a pair of relatively occluded, central maxillary and mandibular incisors is commonly known as the interincisal angle. Determination of the interincisal angle becomes particularly important to the orthodontist in determining when the final stages of orthodontic treatment have been successfully completed. An interincisal angle of 135° is the accepted norm, and orthodontic treatment is directed, at least in part, to the attainment of this angle.

In the past, the accepted method or procedure for determining the interincisal angle was to take a lateral cephalometric head X-ray of the patient and then trace the long axes of the upper and lower central incisors on the X-ray photograph, and then measure the interincisal angle by means of a protractor, or clinometer. This procedure usually required the making of periodic X-ray photographs toward the end of orthodontic treatment, and was consequently both time consuming and expensive.

SUMMARY AND OBJECTS OF THE INVENTION

The present invention provides a relatively small, compact gauge device which may be quickly and easily engaged with a pair of central, upper and lower, incisors toward the labial sides thereof to indicate the interincisal angle therebetween.

The primary object of this invention is to provide the orthodontist with a relatively simple, hand-operated instrument or gauge device by which he may quickly and easily determine the interincisal angle of a patient's teeth without making or otherwise securing numerous X-ray photographs of the patient's head.

In accordance with this invention, I provide an interincisal angle-indicating gauge which comprises a hand-held base frame portion including a first rectilinear limb, projecting outwardly for engagement with one of a pair of upper and lower incisors; a connector arm slidably carried by the base frame for movement along a line perpendicular to the axis of the first limb; a second rectilinear limb pivotally and slidably carried on the connector arm and projecting outwardly in the same general direction as the first limb and engageable with the other of the pair of central incisors, and a scale carried on the connector arm adjacent the second limb for indicating the interincisal angle between the pair of upper and lower central incisors engaged by the first and second limbs of the gauge device.

BREIF DESCRIPTION OF THE DRAWINGS

In the accompanying drawings:

FIG. 1 is a front elevational view, partially in vertical section, of an orthodontic gauge device according to this invention;

FIG. 2 is a side elevational view of the gauge device looking from a plane indicated by the line 2—2 of FIG. 1;

FIG. 3 is an enlarged longitudinal sectional view taken through the upper, adjustable limb along a plane indicated by the line 3—3 of FIG. 1;

FIG. 4 is a similar view taken along the line 4—4 of FIG. 1;

FIG. 5 is a diagrammatic elevational view showing one mode of attachment of the outer ends of the limbs of the gauge device to a pair of upper and lower central incisors;

FIG. 6 is a diagram illustrating the interincisal angle and the included angle between lines drawn tangent to the middle third of the labial surfaces of the upper and lower central incisors; and FIG. 7 is a geometrical diagram showing the derivation of the angle-indicating scale of the present gauge device.

DESCRIPTION OF PREFERRED EMBODIMENT

Referring to FIG. 1 of the drawings, it will be seen that the present gauge device comprises a right-angular base frame 10 which includes an outwardly projecting, generally rectilinear link 11 and a hollow, rectilinear handle portion 12. Advantageously, the handle portion 12 may be formed from a relatively shallow, U-shaped channel member 13 which is fastened by screws 14 to a flat, rectangular base plate 15. The base plate 15, in this instance, forms an integral, right-angular continuation of the limb 11. The channel member 13 is secured to the base plate 15 so as to define a rectangular passage or guideway 16 whose longitudinal axis is perpendicular to the longitudinal axis of limb 11.

Slidably mounted in the guideway 16 of the base frame 10 is one leg 17 of a relatively flat, bifurcated connector arm 18. The connector arm 18 is of generally inverted U-shaped configuration and is formed or otherwise provided in its bight portion with a graduated, quadrant-type scale 19. The opposite leg 20 of the connector arm 18 is disposed in generally parallel, coplanar relation to the guide leg 17 and terminates in a lower hooked extremity 21. Connected to the hooked extremity 21 of the connector arm 18 is one end of a contractile spring 22. The opposite end of the spring 22 is connected by means of a rivet 23 to the limb 11 of the base frame 10. The spring 22 is thus arranged to resiliently hold the connector arm 18 in an elevated or outward position with respect to the base frame 10.

Secured to the connector arm 18, toward the outer end of the guide leg 17 is a second, relatively movable limb 24 which extends outwardly in the same general direction as the fixed limb 11, and which is disposed in relatively spaced, coplanar relation thereto. The limb 24 is adjustably secured to the connector arm by means of a friction-type binding bolt 25 and nut 26. The bolt 25 preferably includes an enlarged, knurled head 25a and a threaded shank portion which extends through a circular opening 27 formed in the connector arm 18 and a longitudinally elongated slot 28 formed in the limb 24. Thus, by loosening the binding bolt 25, the limb 24 may be both pivotally and axially adjusted relative to the connector arm 18. Advantageously, the limb 24 may be formed toward its inner end with an arcuately concave manipulating tab 29 having a knurled or serrated upper edge 29a against which the thumb or finger of an operator may be placed to apply the desired adjustment forces to the limb 24. However, when the bolt and nut assembly is tightened, the limb 24 is securely clamped to the connector arm 18 against relative movement.

Means are provided at the outer ends of each of the limbs 11 and 24 for engaging said limbs with a pair of relatively occluded, upper (maxillary) and lower (mandibular) central incisors 30 and 31, with the axes of the limbs disposed in perpendicular relation to planes tangent to the middle third of the labial surfaces of the respective teeth. Toward this end, each of the limbs 11 and 24 may carry at their outer ends a clam shell-type clamp assembly 32 which may be temporarily engaged or attached to the usual orthodontic bracket 33 which is carried on or forms an integral part of an orthodontic band 34 fitted on the associated tooth. It should be understood that the bands 34 and their brackets 33 are normally present on the teeth of a patient undergoing orthodontic correctional treatment and thus provide a convenient means by which the respective limbs 11 and 24 of the gauge device may be engaged with the teeth with the axes of the limbs disposed in perpendicular relation to planes tangent to the middle third of the labial surfaces of the teeth. However, if desired, the outer ends of the limbs 11 and 24 could be provided with other equivalent means to position the axes of the limbs in the desired approximately perpendicular relation to planes tangent to the labial surfaces of the teeth.

As shown particularly in FIGS. 1, 3 and 4, each of the clamp assemblies 32 comprises a pair of relatively spaced apart jaws 35 and 36 secured to the bifurcated outer end of the associated limb. Each clamp assembly 32 also includes a spring-pressed plunger assembly 37 having a relatively enlarged rectangular head 38 movable axially between the jaws 35 and 36. As will be seen particularly in FIGS. 1 and 5, the outer ends of the jaws 35 and 36 terminate in slightly inwardly hooked extremities having flat outer surfaces 39 disposed in a plane perpendicular to the longitudinal axis of the associated limb.

As previously indicated, the present gauge device is intended to indicate the interincisal angle of a patient's teeth, i.e., the included angle formed between the long axis of a maxillary (upper) central incisor and the long axis of a corresponding mandibular (lower) central incisor, with the teeth in occluded position. However, since it is physiologically impossible to directly reference the gauge device to the axes of the teeth, the present gauge device is directly referenced to the labial surfaces of the teeth, and a mathematical constant which represents the average difference between "interlabial" angle and interincisal angle is used to formulate the calibrations of the scale 19 of the gauge device.

In FIG. 6, the line A–O represents the long axis of an upper (maxillary) central incisor 30, while the line B–O represents the long axis of the corresponding lower (mandibular) central incisor 31. Thus, the included angle AOB constitutes the interincisal angle which is to be indicated by the gauge device. The line C–D indicates a plane which is tangent to the middle third of the labial surface of incisor 30, and the line E–F indicates a plane tangent to the middle third of the labial surface of the lower incisor 31. Thus, the included angle CEF between the lines C–D and E–F constitutes what is referred to as the "interlabial" angle.

It has been found from X-ray examinations of numerous individuals that the difference between the "interlabial" angle CEF and the interincisal angle AOB is, on the average, approximately 35°. Thus, by actually measuring the "interlabial" angle CEF, the approximate interincisal angle AOB may be found merely by subtracting 35° from the "interlabial" angle CEF.

Referring now to the diagram shown in FIG. 7, it will be seen that the "interlabial" angle CEF can be geometrically and/or mathematically determined when the axis (represented by line W–Y) of the fixed lower limb 11 of the gauge device is positioned in perpendicular or right angular relation to the tangent plane E–F, and the axis (represented by line E–X) of the upper movable limb 24 is positioned in perpendicular relation to the tangent plane C–D. With the axes of the limbs 11 and 24 disposed in perpendicular relation to the tangent planes C–D and E–F, the "interlabial" angle CEF is equal to the sum of the angles EXY and WYX. Angle WYX represents the angle between the axes of the fixed limb 11 and the leg 17 of the connector arm 18 which is 90°. Hence, the "interlabial" angle equals angle EXY plus 90°. Thus, assuming that angle EXY is 80°, then the "interlabial" angle would be 80° plus 90°, or 170°. However, as previously indicated, the orthodontist is interested in determining the interincisal angle, and for purposes of convenience, the scale 19 is preferably calibrated to indicate interincisal angles rather than "interlabial"angles. This is easily accomplished simply by subtracting 35° (the average difference between "interlabial" and interincisal angles) from 90° (angle WYZ) and adding this difference of 55° to the actual angle EXY (the angle between the axis of limb 24 and leg 17), and applying the appropriate range of figures to the graduations of the scale 19, using 135° as a median norm for the scale. For example, when the axis of limb 24 is disposed at an actual angle (EXY) of 90° with respect to the axis of leg 17, the index pointer 40 on the limb 24 would register with the FIG. 145 on the scale 19. When the limb 24 is disposed at an angle of 80° with respect to the leg 17, the scale 19 would "read" 135, and so forth.

In operation, the binding bolt 25 is first loosened sufficiently to permit the limb 24 to pivot and slide axially relative to the connector arm 18. The clamp assemblies 32 of the limbs 11 and 24 are then engaged with the brackets 33 of the bands 34 with the incisors 30 and 31 in occluded position, as shown in FIG. 5. This places the flat outer surfaces 39 of the clamp assemblies 32 of the limbs in flush abutting engagement with the middle third of the labial surfaces of the two incisors 30 and 31, with the axes of the limbs disposed in perpendicular relation to the labial surfaces. To facilitate attachment of the limbs to the brackets, the movable limb 24 may be adjusted vertically with respect to the limb 11 by sliding the leg 17 of the connector arm either inwardly or outwardly of the handle portion 12 of the frame 10, and the movable limb 24 may be both pivotally and slidably adjusted relative to the connector arm 18. These adjustments may be easily accomplished by applying proper thumb or finger pressure against the serrated upper edge 29a of the tab 29 while holding the handle portion 12 with the remaining fingers and palm of one hand. This multi-directional adjustment makes it possible to quickly fit and orient the limbs of the gauge device regardless of differences in size and position of the incisors which normally occur between different patients. When the limbs 11 and 24 have been properly adjusted to bring their axes into approximately perpendicular relation to the labial surfaces of the respective teeth, the binding bolt 25 is then tightened to lock the limb 24 against pivotal movement and the gauge device may then be removed from the patient's mouth to visually read the indication on the scale 19. Detachment of the clamping assemblies 32 from the brackets 33 is easily effected simply by moving the gauge device laterally to disengage the clamping assemblies 32 from the brackets 33.

In view of the foregoing, it will be apparent that the present invention provides a convenient and effective tool to enable the orthodontist to quickly determine the interincisal angle of a patient's teeth without resort to numerous, periodic X-ray photographs.

While a single preferred embodiment of the invention has been illustrated and described in detail, it should be understood that various modifications as to details of construction and design may be resorted to without departing from the spirit of the invention or the scope of the following claims.

I claim:

1. An orthodontic gauge device for approximately determining the interincisal angle between a pair of relatively occluded maxillary and mandibular central incisors comprising:

a. a base frame defining a linear guideway;

b. a first, elongated rectilinear limb carried by and projecting laterally outwardly from said base frame in perpendicular relation to said guideway;

c. an elongated connector arm slidably carried in the guideway of said base frame and having a longitudinal axis disposed in right-angular relation to said first limb;

d. a second, elongated rectilinear limb pivotally connected with said connector arm and extending laterally outwardly therefrom in coplanar relation to said first limb, said first and second limbs terminating in relatively spaced apart outer end portions, and one of said limbs being slidably adjustable relative to said base frame and said connector arm to vary the extent of lateral projection of its outer end portion from said base frame and said connector arm;

e. tooth-engaging means carried at the outer end portion of each of said limbs for placing the longitudinal axes of the respective limbs in approximately perpendicular relation to planes tangent to the middle third of the labial surfaces of a pair of relatively occluded maxillary and mandibular central incisors; and f. an angle-indicating scale carried on said connector arm adjacent said second limb for indicating the approximate interincisal angle between a pair of relatively occluded maxillary and mandibular central incisors with which said means are engaged.

* * * * *